United States Patent [19]

Pejcha

[11] 4,071,867

[45] Jan. 31, 1978

[54] APPARATUS FOR ALIGNING THE HEAD-ARM ASSEMBLIES OF A ROTARY ACTUATED DISC DRIVE

[76] Inventor: Ivan Pejcha, 428 Montclair Drive, Santa Clara, Calif. 95051

[21] Appl. No.: 506,126

[22] Filed: Sept. 16, 1974

[51] Int. Cl.$^2$ .................. G11B 5/56; G11B 21/24; G11B 5/54; G11B 21/22
[52] U.S. Cl. ................................ 360/109; 360/105; 360/106
[58] Field of Search ................... 360/97–99, 360/105, 106, 109, 77, 78

[56] References Cited

U.S. PATENT DOCUMENTS

| | | | |
|---|---|---|---|
| 3,009,759 | 11/1961 | Johnson et al. | 360/109 |
| 3,119,989 | 1/1964 | Wasylenko | 360/106 |
| 3,449,734 | 6/1969 | Frey et al. | 360/77 |
| 3,488,640 | 1/1970 | Dirks | 360/98 |

Primary Examiner—Robert S. Tupper
Attorney, Agent, or Firm—Gerald L. Moore

[57] ABSTRACT

In a rotary actuated disc drive apparatus, and especially in such apparatus utilizing a plurality of recording discs, there is provided means for aligning the heads relative to each other and to the disc.

5 Claims, 6 Drawing Figures

APPARATUS FOR ALIGNING THE HEAD-ARM ASSEMBLIES OF A ROTARY ACTUATED DISC DRIVE

SUMMARY OF THE PRIOR ART

In the usual disc drive apparatus, the recording head is supported on an arm which is actuated lengthwise in a straight line along a radius of a rotating magnetic disc having a surface adapted for the recording of information. In such drives, the position of the recording head is detected by apparatus connected with the actuator, or by detecting pre-recorded tracks on the disc. Thus it may become necessary to adjust the distance between the head and the actuator for positioning the head relative to the disc in accordance with the indication of the position detecting means. Such necessity may come about because of the need to correlate the position detecting apparatus with the actual position of the head.

In disc drive apparatus utilizing a plurality of discs stacked one above the other for rotation about the same axis of rotation (called disc packs), a plurality of heads may be positioned by a single actuator. In such apparatus there exists the need to position the heads relative to each other, and preferably directly above each other, so that the position detecting apparatus can act to locate each one or all of the heads relative to the disc surfaces. It is desirable that the heads be positioned to record on the same track of each disc for the convenience of indexing the location of information recorded on the pack.

In the linearly actuated drives usually the only adjustment necessary has been one to change the position of the head relative to the actuator generally along the direction of movement of the head. Because the manufacturing tolerances of the head positioning apparatus can be held rather closely, any slight deviation of the head to one side of the direction of actuation which might occur was not of sufficient magnitude to require compensation.

With the advent of rotary actuated heads on disc drive apparatus, the positioning of the heads relative to the actuator has become more critical. In such apparatus the heads are moved along an arc roughly coinciding with a radius of the disc extending across the disc recording area. Such a disc drive is disclosed in the copending application entitled DISC DRIVE WITH ROTARY ACCESS MECHANISM, Ser. No. 566,122, filed Sept. 16, 1974 and assigned to the same assignee. With such actuation of the heads there still exists the need to adjust the distance between the actuator and the head. But just as importantly there now also has risen the need to adjust the arcuate position of each head relative to the actuator. Such adjustments are necessary for the same reasons as for the linear adjustment of the heads in the linearly actuated disc drives. It is the object of the present invention to provide means for adjusting the heads in a rotary actuated disc drive assembly.

SUMMARY OF THE INVENTION

In a disc drive apparatus a combination of a recording disc, means for supporting the disc for rotation about an axis of rotation, a read/write head adapted for transferring information to and from the disc surface wherein the read/write head is supported on an elongated support arm having one end fixed to a rotary actuator. Releasable means is included with the support arm for permitting the arcuate movement of the head relative to the actuator for adjusting the head position relative to the disc surface. In addition, means are provided for varying the length of the arm between the head and actuator for further adjustment of the head position. cl DESCRIPTION OF THE DRAWINGS FIG. 1 is a top plan view of a rotary actuated disc drive apparatus;

DESCRIPTION OF THE INVENTION

Figure 1:
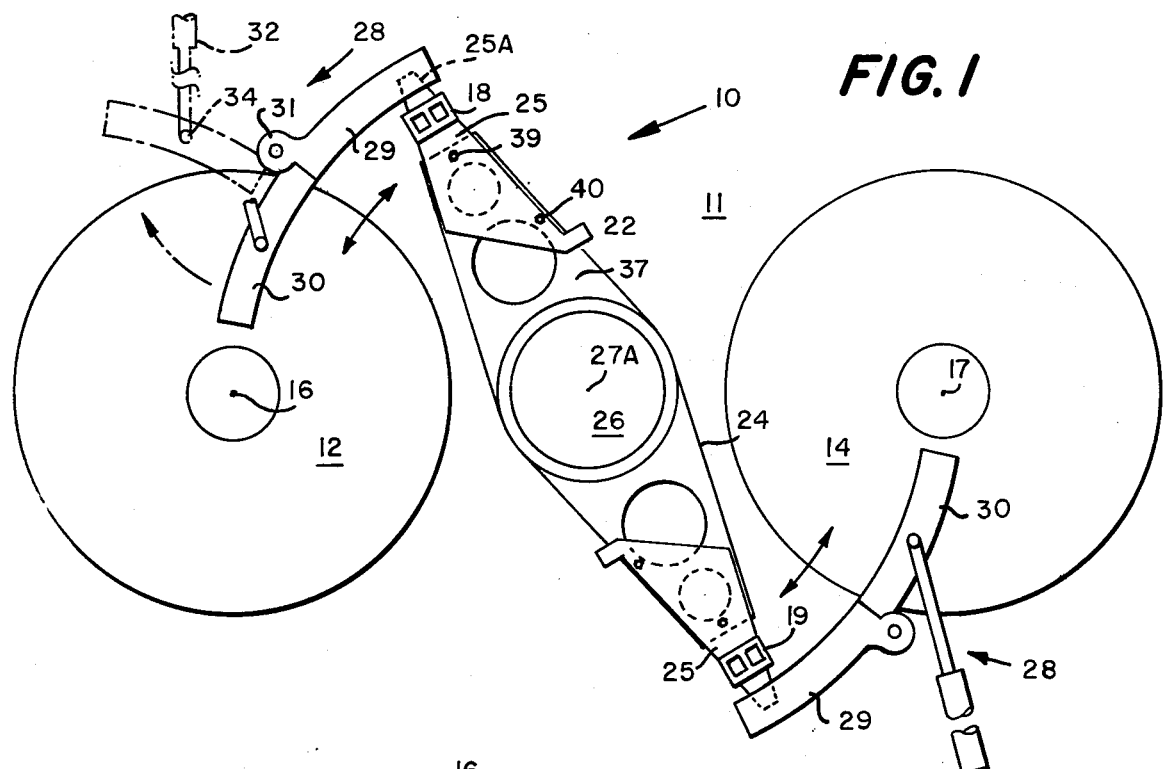
Figure 2:
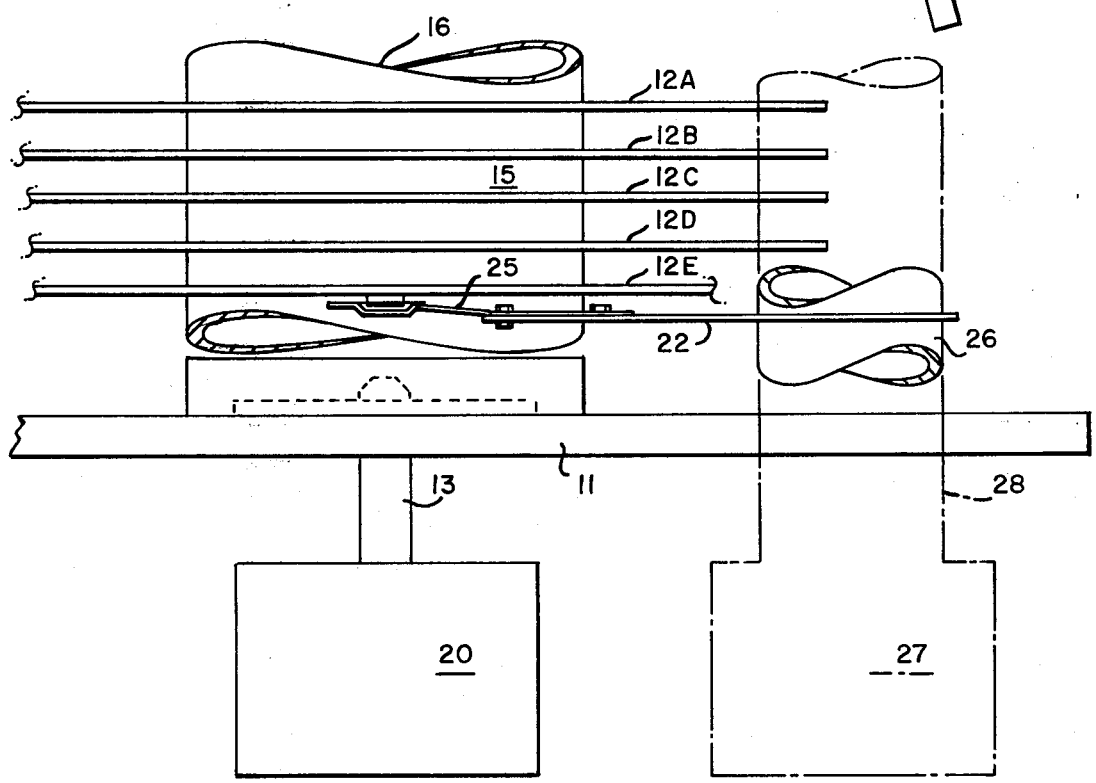
FIG. 2 is a partial side plan view of the apparatus shown in FIG. 1.

In FIG. 1 is shown one example of a rotary actuated disc file in which the subject invention can be used. The disc file 10 comprises a baseplate 11 on which is supported one or more recording discs in the form of packs 12 and 14. The discs are mounted for rotation on the baseplate with the means for mounting generally including a spindle shaft 13 (FIG. 2) journalled in the baseplate and power-driven for rotating the discs. Of course as shown in FIG. 2, the discs can be formed in a disc pack comprising a plurality of discs 12A, 12B, 12C, 12D and 12E, all in vertical spaced relationship on a pack support 15 for rotation about vertical axes 16 and 17. Each disc includes, usually on both top and bottom surfaces, a magnetic film (not shown) on which information or data can be recorded by the use of a proper recording head. The same head usually is used to both read and write information on the disc surface.

As shown in FIG. 1 the read/write heads 18 and 19 are positioned adjacent the top surface of the disc packs 12 and 14 for the purpose of reading and writing information. Such heads are well-known in the industry and generally comprise a magnetic coil with an associated air gap (not shown) which serves to set up a magnetic field intersecting the disc magnetic film. By controlling the direction of the field extending across the air gap, data can be recorded on the disc surface. The data is recorded along concentric tracks as the discs are rotated by energization of such means as a motor 20 connecting to the spindle shaft 13 supporting the disc pack. Thus as the discs are rotated and the heads are translated across the disc surface toward and away from the axis of rotation of the disc, data can be transferred to and from the concentric tracks on the disc surface.

For movement of the heads across the disc surface a means for supporting the heads is provided in the form of a plurality of elongated arms 22 and 24 supporting the heads 18 and 19 associated with the disc packs 12 and 14, respectively. Fixed to the distal end of each arm is a spring member 25 having one end extending horizontally to which a head is fixed. The spring member provides for some deflection toward and away from the disc surface as needed.

The ends of thte arms opposite the read/write heads are fixed to a vertical support 26 journalled for rotation about a central axis 27A extending parallel to the axes of rotation of the disc packs. The support 26 extends through the baseplate 11 to a rotary actuator 27 which when energized, swings the support and arms through an arc sufficient for moving the heads from a position spaced sidewise from the discs to a position adjacent the internal edge of the associated disc recording surface.

As shown in FIG. 1 both arms 22 and 24 are supported from a single actuator and are moved in unison to respective positions adjacent the cooperating discs. However, it should be understood that more than one arm and disc combination can be actuated by a single actuator, or in the alternative, possibly three or four such arm-disc combinations can be positioned by a signle actuator.

For actuation of the heads vertically toward and away from the disc surface once positioned over the disc, there is provided a head-loading mechanism 28 (FIG. 1) which comprises a pair of hinge connected cam members 29 and 30 including camming surfaces (not shown) which bear against the extending end 25A of the spring member 25 supporting the recording head in a manner to hold the heads away from the disc surface. It is necessary to hold the heads away from the surface as they are being moved from a position away from the pack to a position over the disc surfaces. Movement of the heads towards the disc surface is called head loading and serves to shift the head to the data transfer position immediately adjacent to the disc surface.

The cam member 29 is supported directly on the baseplate while the extending member 30 is pivotally connected thereto by a hinge 31 so that it can be swung out of alignment with the discs for loading the heads and removal of the pack, if needed. Also the cam member can be moved away from the disc proximity during the actual time that data is being transferred between the head and disc to prevent any possible interference with the operation of the head and also to prevent any interruption of cooling air flow which normally is passed over the disc surface during operation of the disc drive. For a more complete description of the head loading apparatus, reference can be made to the U.S. application Ser. No. 506,127, entitled HEAD LOADING AND UNLOADING ASSEMBLY FOR A MAGNETIC DISC DRIVE.

As pointed out heretofore, there exists the need to specifically align the heads relative to the discs so that optimum reading and wriging of information can be achieved to enable the interchangeability of disc packs. It is especially important where a plurality of heads are utilized on a disc pack as shown in FIG. 2. For instance one surface, say the lower surface of the disc 12E, might be utilized as a servo track surface where prerecorded track locations are supplied. In such a structure, one recording head is dedicated to the detection of the servo track. Thus, by detection of the servo signal, the servo head can be centered at the servo track. Since all of the arms are fixed together to the actuator the other arms are thus positioned at that specific track location. However, it is important that the heads are positioned vertically together in the same cylinder at all times. A cylinder is made up of the same data tracks on each disc stacked vertically.

Figure 3:
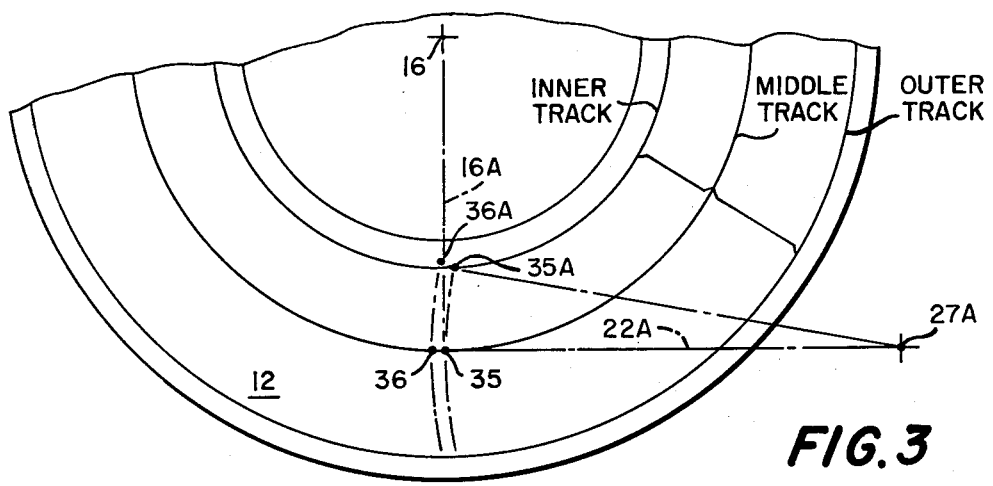
FIG. 3 is a line diagram showing directions of misalignment which the subject invention is used to correct.

With the rotary actuation of the head it is also essential that the head be centered lengthwise so as to be moved as near as possible on a radius extending normal to a center line passing between the central axis of the actuator and tangent to the middle track position on the disc surface. Referring now to FIG. 3 the central axis 27A of the actuator is shown along with the disc axis of rotation 16 for the disc 12. The optimum position for the head is at point 35 at the point of intersection where the axis 22A of the arm is perpendicular to the radius 16A of the disc. When at this point the head, in being swung to the left and right to the inner and outer tracks, krespectively, will be less inclined to those tracks at the outer extremities. Naturally there will be some inclination since the optimum position would be to move the head directly along the radius so the head remains normal to the data track. Since the head is swung along an arcuate path this is not possible thereby leaving the most optimum head position as that position with the head normal to the middle track such that any deviation to either side is divided equally thereby lessening the maximum deviation of the head relative to the track.

More importantly it is necessary that all the heads be positioned vertically one above the other so recording can take place in the same track on each disc surface for any one position of the actuator. Such is necessary for the interchangeability of the disc packs, with the substitution of packs, or movement from position to position, it must be assured that the heads at each pack will be over the desired track when the servo positioner positions at that preselected track.

In accordance with one feature of the present invention, there is provided an adjustable hinged mid-section for the elongated support arm on which the read/write head is mounted for adjusting the angular position of the head relative to the arm and actuator. Such means for adjustment are provided on each of the support arms so that each may be individually aligned during assembly to thereafter provide for the optimum operation of the head in transferring data to and from the disc.

Figure 4:
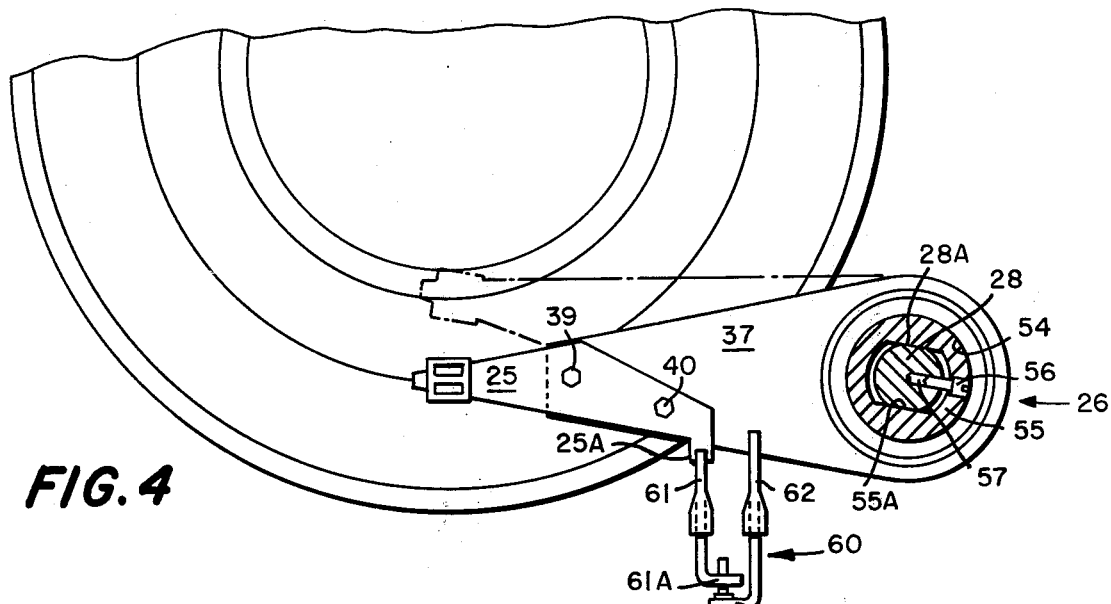
FIG. 4 shows a method for aligning the heads.

Accordingly, the arm in the preferred embodiment shown in FIGS. 1 and 4 is formed of two sections 25 and 37, which are fixed together in overlapping fashion to form an adjustable hinged section at the mid-section of the arm to permit the angular adjustment of the arm and therefore of the head relative to the actuator. The inner arm section 37 is fixed to the actuator by some suitable means while the arm outer spring section 25 supporting the head is extended along the inner arm section in overlapping relationship. These two sections are fixed together by a pair of bolt fasteners 39 and 40 passing therethrough in a manner to maintain the arm rigid while still being releasable to permit some pivotal adjustment between the two arm sections.

Figure 5A:
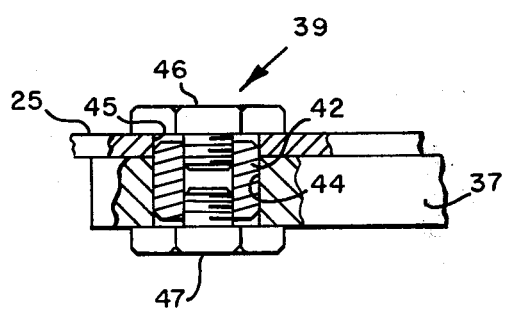
FIGS. 5A and 5B are enlarged cross-sectional views of the releasable locking means on the support arm.

Preferably the bolt fastener 39 provides an exact point about which the arm sections rotate while the bolt fastener 40 is releasable to permit arcuate displacement of the spring arm section relative to the inner section. Illustrated in FIG. 5A is an example of a suitable bolt fastener 39. This fastener comprises a sleeve 42 which is press-fit into an opening 44 in the arm section 37. This sleeve also fits into a similar press-fit sized opening 45 in the outer arm section 25 and is slightly shorter in length than the combined widths of the two arm sections. The sleeve is threaded internally at both ends to receive the bolts 46 and 47 which when tightened, clamps the sections 37 and 25 tightly together. Thus while some angular displacement of the arm sections is permitted with the loosening of the bolts, relative longitudinal movement (to the right or left in the drawing) which otherwise would tend to change the length of the supporting arm is prevented.

Figure 5B:
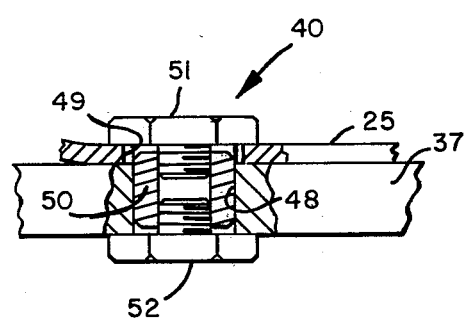

In FIG. 5B is shown a suitable example for the fastener 40. Therein the arm section 37 is provided with an opening 48 while the outer arm section 25 is provided with an opening 48 while the outer arm section 25 is provided with an opening 49. A sleeve 50 loosely fits within this opening and is fixed in position by bolts 51 and 52 threaded into the outer ends thereof. Because of the loose fit the arm sections can pivot relative to each other about the fastener 39 for altering the angular positioning of the arm sections 37 and 25. Normally such angular adjustment need only be one degree or less.

Thus one step in the head alignment procedure is achieved by energizing the actuator to move one head to what would normally be the middle track position shown in FIG. 3. Preferably this is achieved by energizing the actuator for positioning the servo head at the middle track position. With the servo head indicating the middle track position, the bolts 46 and 51 are loosened on the arm supporting the head to be aligned and the outer arm section 25 is pivoted about the fastener 39 until a maximum signal is read by the head 18 from the disc surface 12A. For head alignment, a disc pack preferably is utilized which has precisely positioned prerecorded data tracks to be utilized for testing and alignment purposes. Thereafter the bolts are again tightened to fix the arm sections into one rigid arm. The actuator is then energized to position the head at either the inner or outer track position. At this point the head should detect the signal prerecorded at that position. If a weaker than optimum signal is detected, it is most probably because the arm length is not optimum.

As can be seen in FIG. 3, if the head is positioned at point 35, the optimum position, the actuator can be energized to move the arm through an arc sufficient to position the head at point 35A as detected by the servo head in the manner previously described. The head can then be used to read the prerecorded track at that position to ascertain that the head is correctly positioned. However if the head was originally positioned at point 36, energization of the actuator through the same arcuate travel that would normally move the head from point 35 to 35A, will position the head at point 36A. Point 36A is not aligned with the inner track therefore the head 18 will not read efficiently the signal prerecorded at that position, indicating the arm length is not correct and must be adjusted.

For the adjustment of the arm length, another feature of the invention is shown in FIG. 4 comprising means for adjusting the relative position of the inner arm section 37 relative to the actuator support 26. For this purpose the inner arm section 37 includes a opening 54 into which is fixed a sleeve 55. Journalled in this sleeve is a screw fastener 56 which may be rotated but will not move longitudinally relative to the sleeve. This screw fastener is threaded opening 57 in the support shaft 28. The outer cross-sectional configuration of the shaft 28 includes the opposing flat surfaces 28A which closely fit the cooperating flat surfaces 55A of the arm sleeve 55 so as to cause the arm to rotate with the support while permitting limited longitudinal movement of the arm relative to the actuator when the screw 56 is turned. By loosening and tightening the screw 56, the arm section 37 is moved relative to the support 26 to vary the length of the arm between the central axis 27A of the actuator and the recording head. Even though two heads are supported in each arm and therefor adjusted simultaneously by this method, by controlling closely the length of the spring member 25, any problems of misalignment between heads on one arm are minimized.

Thus the second step for alignment of the head is to move the head to the inner (or outer track) and adjust the arm length until an optimum signal is read by the head at that position. Thereafter the head is at or near the optimum position for efficient recording and reading of data on the disc surface.

A second possible method of aligning te heads without utilizing the two actuator position method just described involves the prerecording on the associated disc surface a head position track with a superimposed index track thereon. By pivoting the spring arm 25 for the maximum head position track signal, then adjusting te screw 56 for simultaneous head sensing of the index signal, the head positions can be aligned by a somewhat simpler procedure.

As a further embodiment of the invention, there can be provided a tool 60 (FIG. 4) which interfits with the arm sections 37 and 25 in a manner to permit precise angular adjustment of the arms relative to each other. This tool consists of an arm 61 which clamps onto an extension 25A of the outer arm section 25 and an arm 62 which clamps onto the inner arm section 37. By turning the screw member 64 which is differentially threaded into the bent portions 61A and 62A of the arms, the relative angular position of the arm sections 37 and 25 can be adjusted and held while the fasteners 39 and 40 are tightened to hold the arm sections.

I claim:

1. In a disc drive apparatus adapted to transfer data located in concentric tracks on a rotating magnetic disc having a disc surface, the combination of: a recording head interacting with the disc when energized for transferring data therebetween; a support arm on which said head is carried for movement in a planeparallel to said disc surface; said support arm having two sections, actuator means connected to the support arm for moving the arm along an arcuate path in said plane to position the head at any selected track on the disc surface; and adjustment means operatively interconnecting said two sections of the support arm for adjustably displacing said two sections relative to each other in said plane to position the head in spaced relation to the actuator means to set the precise location of the head in said plane over a selected track on the disc in any position of te actuator means.

2. In a disc drive apparatus as defined in claim 1, the combination including means for adjusting the length of the support arm between the head and actuator for setting the head location relative to the disc.

3. In a disc drive apparatus the combination of: a recording disc having a surface adapted for the recording of information in concentric tracks thereon; means supporting said disc for rotation about an axis of rotation; a read/write head for transferring information to and from the tracks on the disc surface; an elongated arm on which the read/write head is carried in a plane parallel to said surface; rotary actuator means connected to the support arm and energizable for moving the read/write head along an arcuate path in said plane across the srface of the recording disc, said elongated support arm being formed of two sections and adjustment means pivotally interconnecting said sections remote fromthe actuator means for adjusting the angular position of the two sections relative to each other in said plane thereby permitting the precise positioning of the head on the disc for any preselected energization of the actuator means.

4. In a disc drive apparatus as defined in claim 3, said support arm includes releasable locking means for enabling the setting of the relative position of the head and arm and thereafter locking said sections during energization of the actuator means.

5. In a disc drive apparatus as defined in claim 3, said combination including means to adjust the length of the support arm between the read/write head and the actuator for permitting the precise positioning of the head on the disc for any preselected position of the actuator.

* * * * *